United States Patent

Nitschke et al.

[11] Patent Number: 6,068,287
[45] Date of Patent: May 30, 2000

[54] ELECTRONIC DEVICE AND METHOD FOR ACTUATING A PASSENGER-PROTECTION SYSTEM

[75] Inventors: Werner Nitschke, Ditzingen; Wolfgang Drobny, Heilbronn; Otto Karl, Leonberg-Höfingen; Jochen Seibold, Tübingen; Dietmar Köhler, Wolfschlugen, all of Germany

[73] Assignee: Robert Bosch GmbH, Stuttgart, Germany

[21] Appl. No.: 09/029,411

[22] PCT Filed: Aug. 7, 1996

[86] PCT No.: PCT/DE96/01472

§ 371 Date: Apr. 24, 1998

§ 102(e) Date: Apr. 24, 1998

[87] PCT Pub. No.: WO97/08022

PCT Pub. Date: Mar. 6, 1997

[30] Foreign Application Priority Data

Aug. 30, 1995 [DE] Germany ............... 195 31 899

[51] Int. Cl.⁷ .................................................. B60R 21/32
[52] U.S. Cl. ........................................... 280/735; 280/735

[58] Field of Search .................. 280/735, 734; 180/271, 282; 307/10.1

[56] References Cited

U.S. PATENT DOCUMENTS

| 5,365,114 | 11/1994 | Tsurushima et al. | 307/10.1 |
| 5,587,906 | 12/1996 | Mciver et al. | 364/424.045 |
| 5,596,497 | 1/1997 | Honda | 364/424.055 |
| 5,809,439 | 9/1998 | Damisch | 701/45 |

*Primary Examiner*—Lanna Mai
*Assistant Examiner*—Kevin McKinley
*Attorney, Agent, or Firm*—Kenyon & Kenyon

[57] ABSTRACT

An electronic device includes a sensor which detects acceleration values, and a control unit linked to the sensor. The control unit drives switching elements, which are disposed in a series circuit including at least one squib. When the switching elements are driven, the squib receives a current. This current flows at the same time through the also series-connected resistor, across which a voltage drop arises, which is analyzed by a comparator. The pulse duty factor of the current driving is modified as a function of the amperage of the current flowing through the squib.

18 Claims, 6 Drawing Sheets

ELECTRONIC DEVICE AND METHOD FOR ACTUATING A PASSENGER-PROTECTION SYSTEM

FIELD OF THE INVENTION

The present invention relates to an electronic device and a method for actuating passenger-protection systems.

BACKGROUND INFORMATION

Article No. 1141, Ingénieurs de l'Automobile No. 6 1982, pp. 69–77, and in particular FIG. 19 on page 74, describes a safety device for vehicle occupants. The safety device includes squibs, (i.e. firing pellets), which are actuated by a control unit. Upon actuation, the squibs activate a gas-producing propellant charge, which is operatively connected to an internal restraining device for vehicle occupants, such as, in particular, an airbag, and inflate said airbag. U.S. Pat. No. 3,911,391 describes a method for testing such squibs. In this context, the squibs to be tested receive a testing current supplied by a testing current source. The ensuing voltage drop is compared in a comparative circuit to the voltage supplied by a reference voltage source. The accuracy of such measurement is a function of the accuracy of the test current fed to the squib during the test. However, when working with integrated circuits, it is relatively difficult and expensive to provide a highly precise current source.

SUMMARY OF THE INVENTION

An electronic device and method according to the present invention have the advantage of a substantial overload protection for the control unit's output stage that actuates the squib, even when the squib's resistance value deviates markedly from its setpoint value, and particularly when it is considerably below said value. This allows to use an output stage with comparatively small dimensions, which, in an integrated design, requires only little chip surface. This, urn, leads to a cost reduction. A very flexible response to the squib's resistance fluctuations is possible, because the squib is actuated in timed cycles by a resistance value that deviates from its setpoint value, the current being measured at every cycle. The minimum energy required for activating the squib can advantageously be made available even when the resistance value of the squib deviates quite markedly from its setpoint value. Even in the event that the squib's resistance is short-circuited, the maximum energy required by the control unit is limited by the squib's timed fixed-cycle actuation. Furthermore, through a marked rise in the current amplitude and resultant scavenging of short-circuits and/or shunts, a reliable squib actuation can be achieved even under very difficult operating conditions.

DETAILED DESCRIPTION OF THE INVENTION

Figure 1:
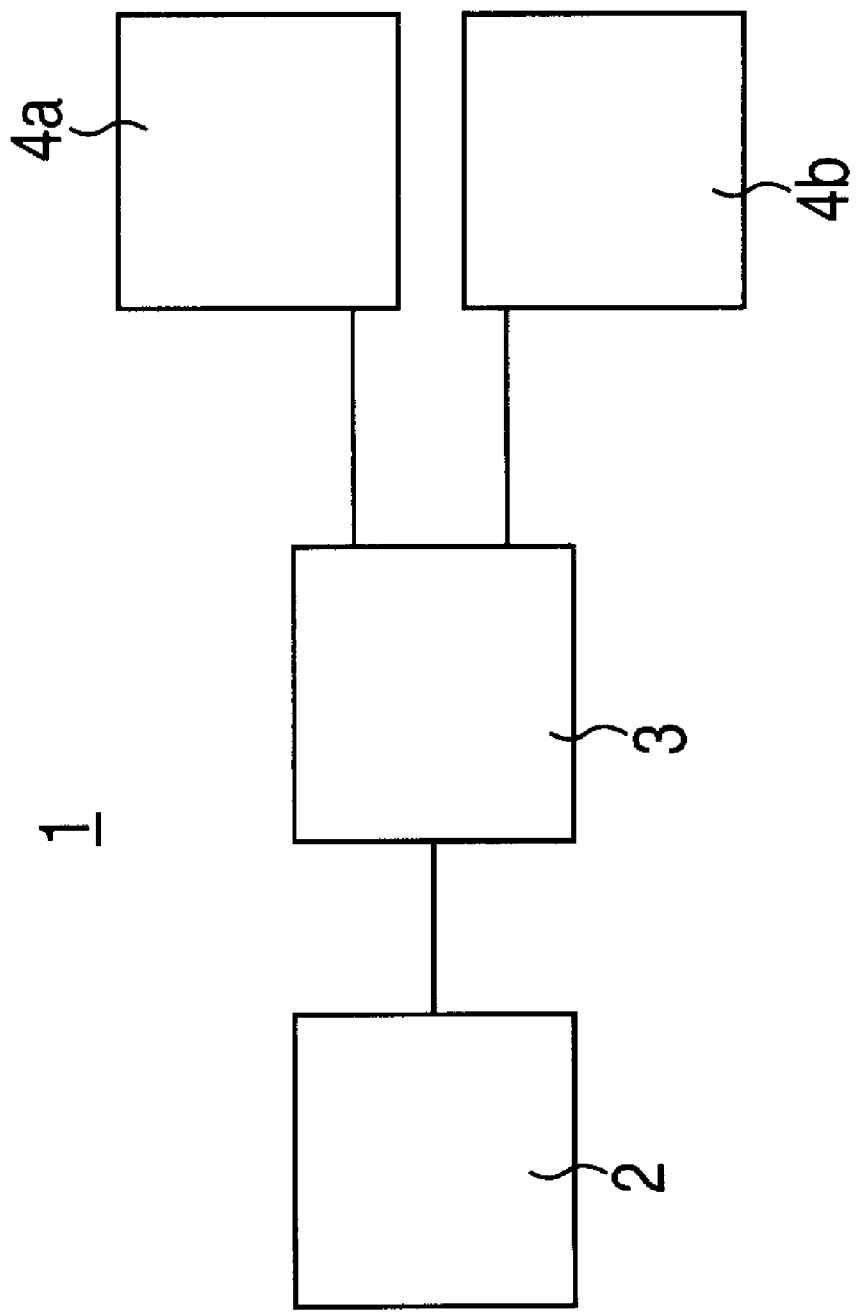
FIG. 1 shows a block diagram of an exemplary embodiment of an electronic device according to the present invention.

FIG. 1 shows a simplified block diagram of an electronic device 1 of the species. This device comprises a sensor 2, which detects the vehicle's acceleration values and whose output terminal is linked to the input terminal of a control device 3, which analyzes the output signals from sensor 2. Control unit 3, in turn, is linked to restraining devices 4a, 4b for protecting vehicle occupants, such as, in particular, airbags, belt tighteners, and/or the like. Control unit 3 responds to a critical accident situation, by activating restraining devices 4a, 4b, which then offer protection to the occupants.

Figure 2:
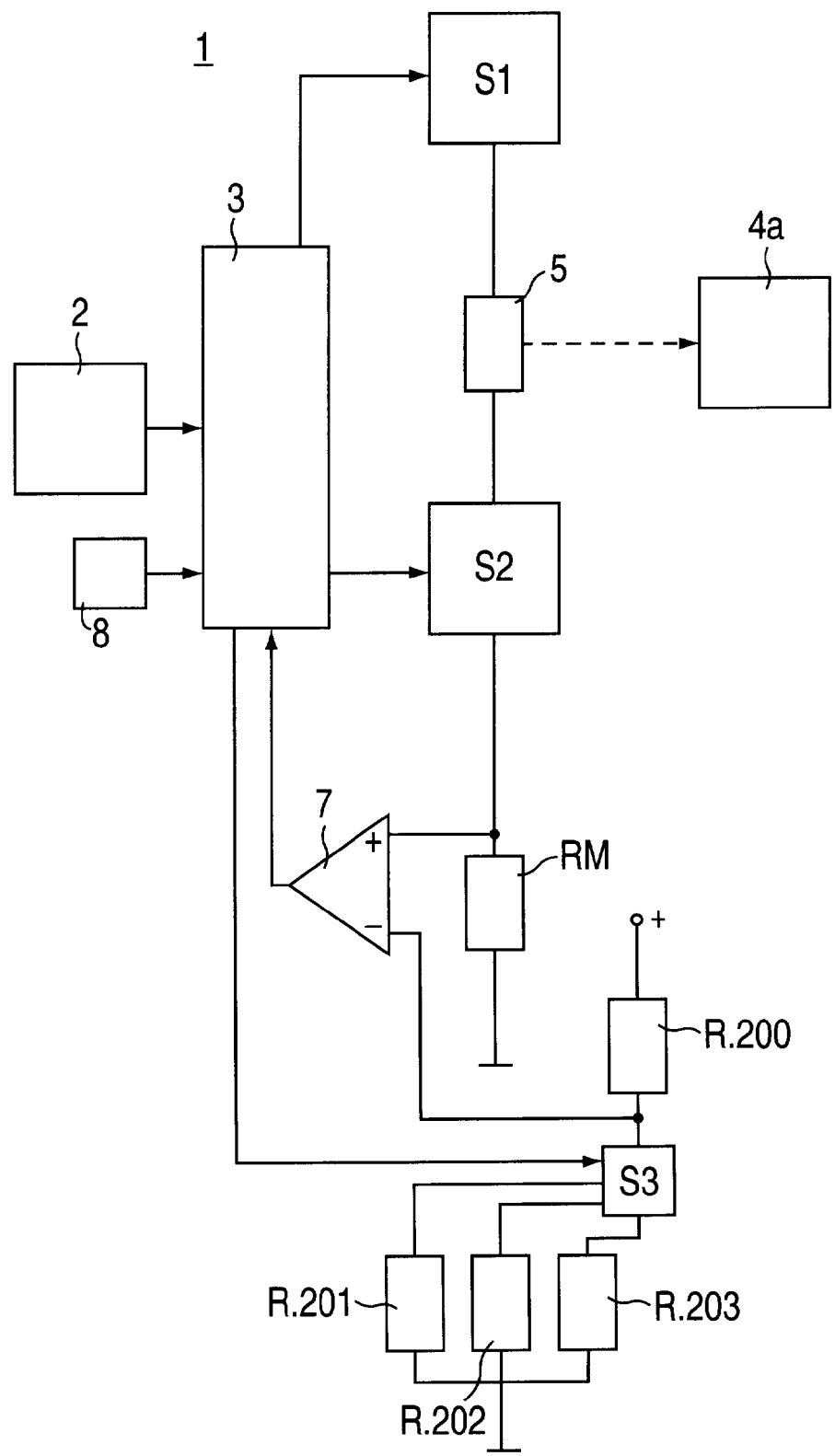
FIG. 2 shows a detailed block diagram of the electronic device with the squib being shown.
Figure 3:
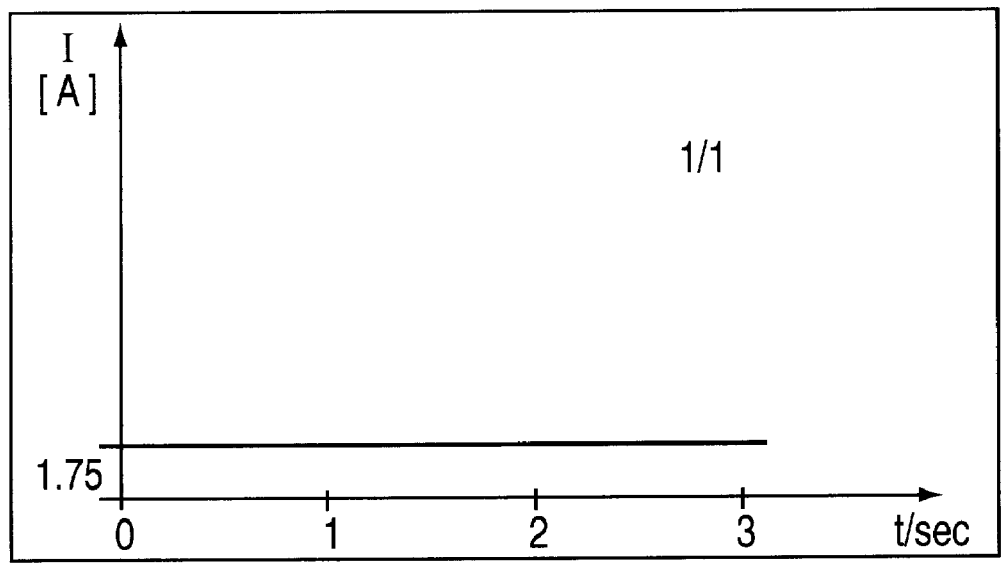
FIG. 3 shows a current profile plotted as a function of time.
Figure 4:
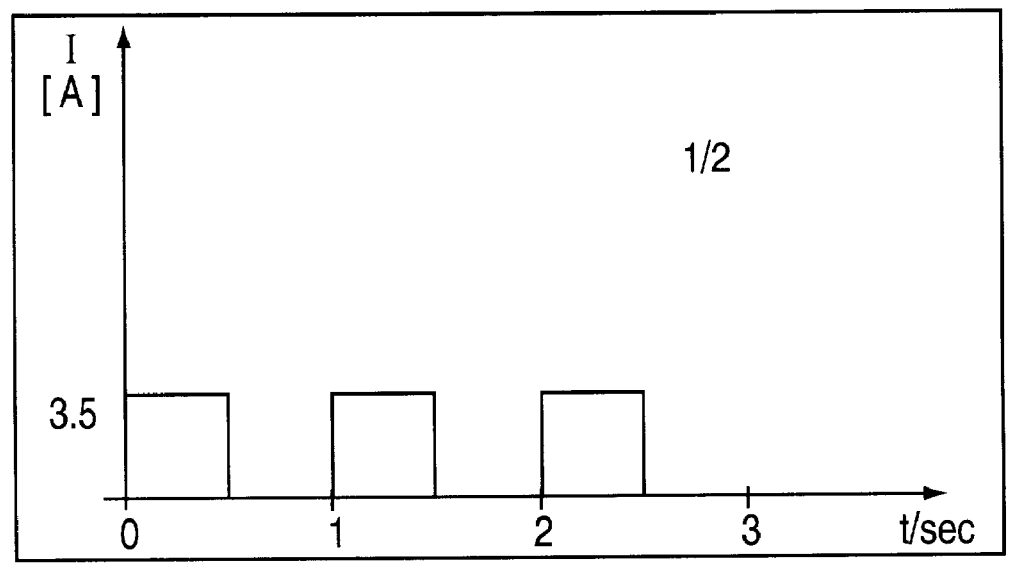
FIG. 4 shows another current profile plotted as a function of time.
Figure 5:
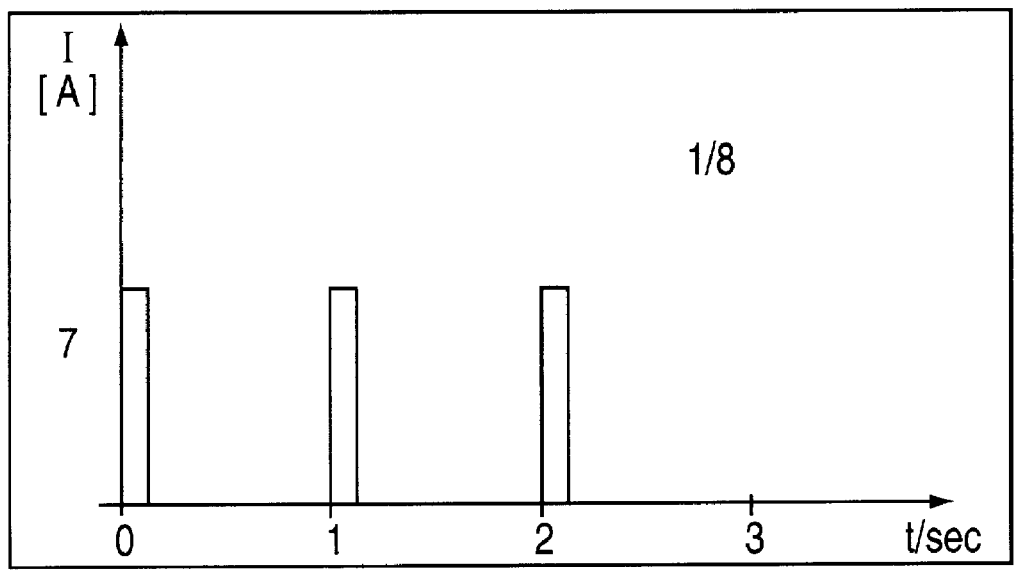
FIG. 5 shows yet another current profile plotted as a function of time.
Figure 6:
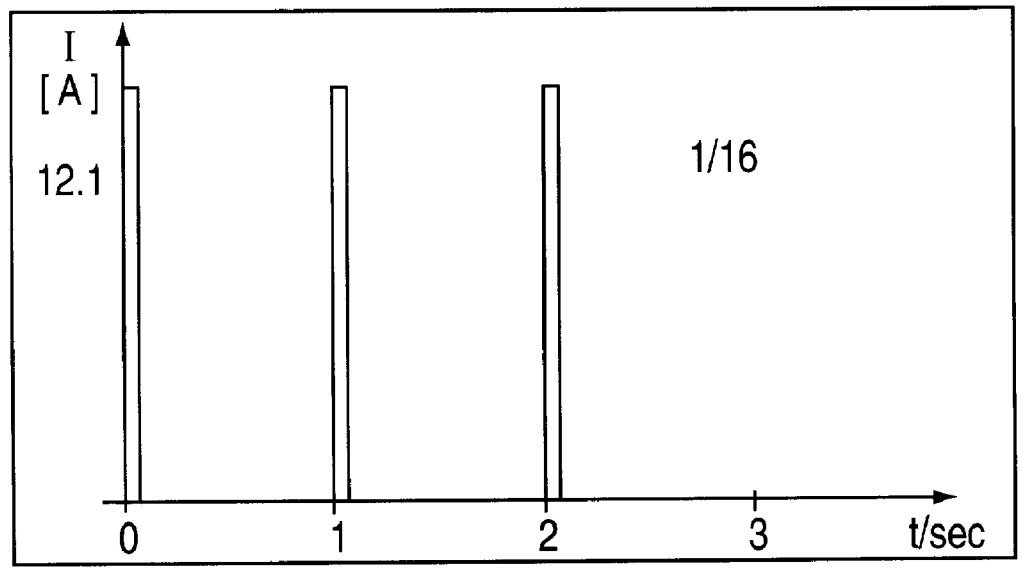
FIG. 6 shows a further current profile plotted as a function of time.
Figure 7:
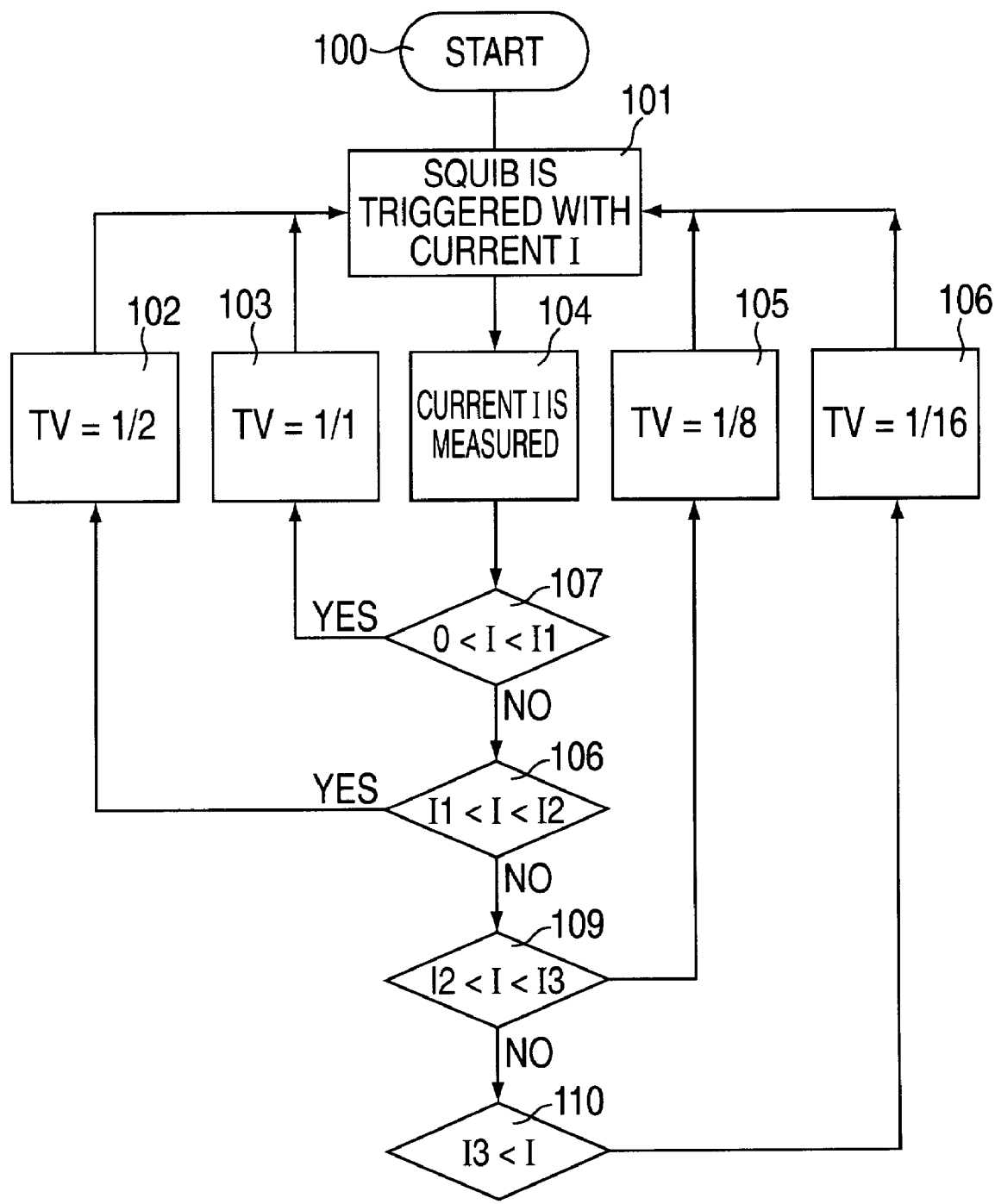
FIG. 7 shows a flow chart according to the present invention.

FIG. 2 shows a detailed block diagram of an electronic device of the species, squib 5 itself also being depicted. Device 1 includes, a sensor 2, which is linked to a control unit 3. Output terminals of control unit 3 are connected to switching elements S1, S2, which are connected in series to a squib 5. Also connected in series thereto is a resistor RM, which is connected by a terminal to ground. At least one restraining device 4a is operatively connected to squib 5. This operative connection is indicated by the dashed line in FIG. 2 between squib 5 and restraining device 4a. Device 1 also includes, a comparator 7 in the form of an operational amplifier, whose non-inverting input terminal is linked to the terminal of resistor RM that is distant from ground. The inverting input terminal of comparator 7 is linked to a reference voltage source, preferably designed to be switchable to a plurality of voltage values. An especially simple and inexpensive reference voltage source is constituted, as shown in the exemplary embodiment in FIG. 2, by a voltage divider (resistors R200, R201, R202, R203) connected to the operating voltage. A third switching element S3 renders possible the alternating series connection of resistors R201, R202, R203 to resistor R200, disposed above them, so that different reference voltage values are generated at the center tap of the voltage divider connected to the inverting input terminal of comparator 7. Switching element S3 is controlled by control unit 3. The output terminal of comparator 7 is linked to an input terminal of control unit 3. Sensor 2 supplies output signals corresponding to the vehicle acceleration, which are analyzed by control unit 3. In this context, the output signal from sensor 2 is usually integrated, and the integration value is compared to a specifiable threshold value. If this threshold value is exceeded, which points to a serious accident, switching elements S1, S2 are driven by control unit 3. As a result, current is applied to the at least one squib 5, causing it to heat up. Squib 5 is operatively connected to a restraining device 4a, such as, in particular, an air bag and, for its part, activates a gas-producing propellant charge, which inflates the air bag. Furthermore, in series to the aforementioned components, a resistor RM is switched into the ignition circuit containing switching elements S1, S2 and squib 5, the ignition current applied to squib 5 likewise flowing through said resistor RM. There is then a subsequent drop across this resistor RM of a voltage, which is compared to at least one reference voltage using comparator 7. Thus, in terms of circuit engineering, it is easy to detect the current applied to squib 5. At this point, in accordance with the present invention, when squib 5 is actuated by an ignition current, this ignition current is measured and, in fact, preferably in each case after preset time intervals, as defined by a clock-pulse generator 8. This clock-pulse generator 8 is preferably integrated in control unit 3. However, as shown in FIG. 2, it can also be a module that is separate therefrom. The manner in which the current applied to squib 5 is measured and controlled is elucidated in the following with reference to the diagrams illustrated in FIGS. 3 through 7. In this context current profiles are plotted in the diagrams of FIGS. 3 through 6 as a function of time, while the diagram of FIG. 7 is a flow chart. The flow chart of FIG. 7 shows the at least one squib 5 (FIG. 2) being triggered in starting step 100 and receiving current in accordance with step 101. In step 104, current I flowing through squib 5 is measured, in that the voltage drop across resistor RM connected in series to squib 5 is detected. In step 107, current I is compared to a first setpoint value I1 of the current. This comparison is made in that comparator 7 compares the voltage drop detected across resistor RM to a first voltage reference value. For as long as current I remains below the first current-limiting value I1, squib 5, as proceeds from step 103 of the diagram of FIG. 7, receives a current, whose pulse duty factor TV is 1. In a preferred exemplary embodiment of the present invention, the first current-limiting value I1 is $\leq$ 3 amperes. Therefore, when squib 5 receives an ignition current on the order of about 1.75 amperes, the pulse duty factor TV is 1, as is evident from the diagram of FIG. 3. Thus at an amperage of about 1.75 amperes, the ignition current flows as a continuous current through squib 5, until definitive activation of said squib 5. In the case that current I flowing through squib 5 exceeds first current-limiting value I1, it is checked in step 108 of FIG. 7 whether current I flowing through squib 5 still lies below a second current-limiting value I2, which in another preferred exemplary embodiment of the present invention lies, for example, at about 6 amperes. Should that be the case, then, in accordance with step 102 of FIG. 7, pulse duty factor TV of the current driving is modified and, in fact, in particular, reduced to ½. This also proceeds from the diagram according to FIG. 4, from which it is apparent that, at about 3.5 amperes, current I lies, in fact, above first current-limiting value I1, but still below second current-limiting value I2. Accordingly, at this point, squib 5 is triggered with clock-pulse timing by current I, pulse duty factor TV preferably being ½. If, in measuring current I, it is ascertained that said current I also exceeds second current-limiting value I2 (compare step 109 in FIG. 7), but still lies below a third current-limiting value I3, then, in accordance with step 105, pulse duty factor TV of the current driving is reduced to ⅛. In yet another exemplary embodiment of the present invention, this third current-limiting value I3 lies preferably at about 12 amperes. This is also elucidated on the basis of the diagram of FIG. 5. It was determined in the measuring program, that the current flowing through squib 5 is about 7 amperes and, thus, fulfills the condition of step 109 of the flow chart according to FIG. 7. Accordingly, pulse duty factor TV is reduced to ⅛. Finally, if current I flowing through squib 5 lies above third current-limiting value I3 (compare step 110 of FIG. 7), then pulse duty factor TV is further reduced to ¹⁄₁₆ in accordance with step 106 of FIG. 7. This is clarified on the basis of the diagram of FIG. 6. The current flowing through squib 5 of about 12.1 amperes exceeds the value 12 amperes of third current-limiting value I3. Accordingly, a current control is carried out so as to now effect a pulse duty factor TV of ¹⁄₁₆. With the above described current control, less load is applied to the output stage acting upon squib 5. This makes it advantageously possible to use an output stage of small dimensions, which, in an integrated design, requires only a comparatively small chip surface. As a result, the size can be reduced altogether, with no insurmountable thermal problems occurring. Since the squib may be driven with clock-pulse timing, and a measuring operation is carried out for current I at least with every clock pulse, any change in current I can be reacted to very quickly and, if necessary, pulse duty factor TV can be immediately adapted. In yet another preferred exemplary embodiment of the present invention, a clock-pulse generator 8 is used, which emits a clock frequency of a few 10 kilohertz, in particular 40 kilohertz. In this context, pulse duty factor TV is effectively represented as a quotient with the denominator 2, or a multiple thereof, e.g., 1, ½, ⅛, ¹⁄₁₆. Since squib 5 can also be driven with relatively high amperage I, it can also be ensured that conditions, such as short-circuits or shunts, which generally have a disruptive effect on the actuation process, are able to be eliminated by scavenging. Thus, a systematic triggering of squib 5 is rendered possible, even in unfavorable situations. As a result, a squib 5 can even still be triggered, when its actual resistance deviates substantially from its setpoint resistance. Commercial squibs usually have resistances on the order of a few ohms, mostly about 2 ohms.

Figure 8:
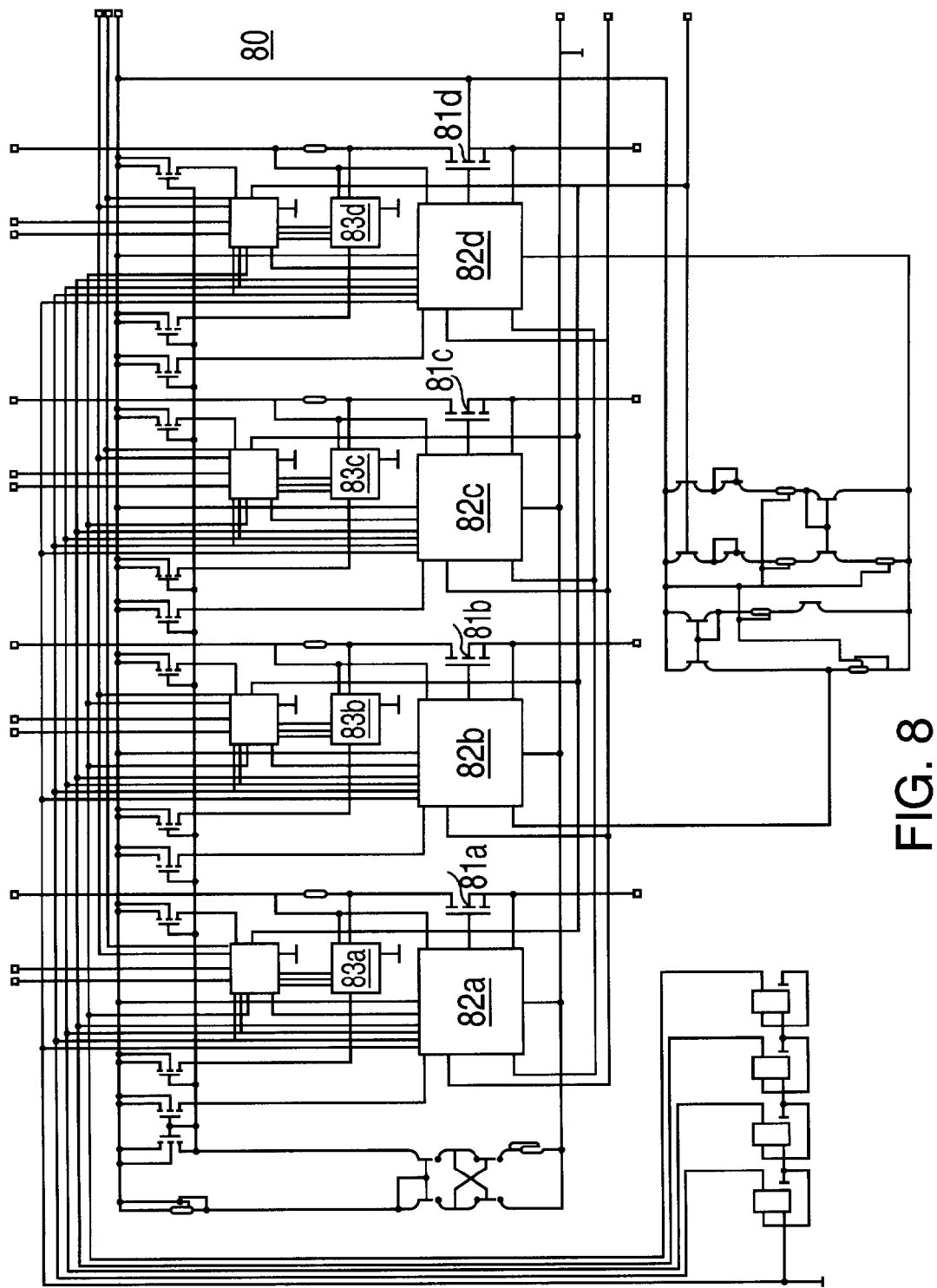
FIG. 8 shows another exemplary embodiment of the electronic device including a plurality of output stages for triggering a plurality of squibs.

Electronic device 1 further includes advantageously an integrated electronic circuit 80 (FIG. 8), in which are integrated a plurality of switching elements 81$a$, 81$b$, 81$c$, 81$d$ of driver circuits 82$a$, 82$b$, 82$c$, 82$d$ for said switching elements, and of comparators 83$a$, 83$b$, 83$c$, 83$d$. The high level of integration not only ensures a small and space-saving type of construction, but also allows for a multiplicity of squibs 5 to be triggered. In FIG. 8, connecting leads IGH0, IGH1, IGH2, IGH3 linked to switching elements 81$a$, 81$b$, 81$c$, 81$d$ lead to squibs (not shown here), which are, in fact, disposed outside of this electronic circuit 80 in the immediate vicinity of the restraining devices. Sketched in, in each case, in series to switching elements 81$a$, 81$b$, 81$c$, 81$d$, are resistors R50, R51, R52, R53, which are traversed by the flow of the current that is applied to the squibs. The connecting leads of the afore-mentioned resistors R50, R51, R52, R53 are each linked to input terminals of comparators 83$a$, 83$b$, 83$c$, 83$d$, which sense the voltage drop occurring across the resistor in question and compare said drop to a predefined reference value.

What is claimed is:

1. An electronic device for actuating a passenger-protection system, comprising:

at least one acceleration sensor generating a sensor signal;

a control unit for analyzing the sensor signal;

at least one squib coupled to the control unit and being traversed by a current;

at least one restraining device being selectively actuated by the control unit using the at least one squib;

a current detecting arrangement detecting a value of the current flowing through the at least one squib and comparing the value of the current to at least one predetermined threshold value; and a current control arrangement coupled to the current detecting arrangement controlling a clock pulse duty factor of the current flowing through the at least one squib.

2. The electronic device according to claim 1, wherein the at least one restraining device includes at least one of: i) an airbag, and ii) a belt tightener.

3. The electronic device according to claim 1, wherein the clock pulse duty factor is controlled as a function of the value of the current flowing through the at least one squib.

4. The electronic device according to claim 1, wherein the current detecting arrangement includes:
- a measuring resistor arranged in a circuit of the at least one squib, and
- a comparator comparing a voltage drop across the measuring resistor to at least one reference voltage.

5. The electronic device according to claim 1, wherein the current detecting arrangement further comprises:
- a multiple comparator for comparing the value of the current to multiple predetermined threshold values.

6. The electronic device according to claim 1, further comprising:
- a clock-pulse generator coupled to the control unit and having a clock frequency of at least 10 kHz.

7. The electronic device according to claim 1, wherein electronic components for the device are comprised on:
- an integrated electronic circuit coupled to the control unit and including:
  - a plurality of switching elements,
  - driver circuits for the plurality of switching elements, and
  - a plurality of comparators.

8. The electronic device according to claim 5, wherein the multiple comparator is a triple comparator.

9. The electronic device according to claim 6, wherein the clock frequency of the clock-pulse generator is 40 kHz.

10. A method for operating an electronic device for actuating a passenger-protection system, the passenger-protection system including at least one restraining device actuated using at least one squib, comprising the steps of:
- receiving a current flowing through the at least one squib;
- measuring a value of the current after a predetermined time period;
- comparing the measured value of the current to a predetermined threshold value; and
- if the value of the current deviates from the predetermined threshold value, modifying a clock pulse duty factor of the current.

11. The method according to claim 10, further comprising the step of:
- if the value of the current deviates from the predetermined threshold value, modifying an amplitude of the current flowing through the at least one squib.

12. The method according to claim 10, further comprising the step of:
- if the value of the current deviates from the predetermined threshold value, increasing an amplitude of the current flowing through the at least one squib.

13. The method according to claim 10, wherein the predetermined threshold value includes a first set-point value, a second set-point value, and a third set-point value, the first set-point value being at most 3 amperes, the second set-point value being at most 6 amperes, and the third set-point value being at most 12 amperes.

14. The method according to claim 13, wherein the pulse duty factor is 1 when the value of the current is between 0 and the first set-point value, the pulse duty factor is ½ when the value of the current is between the first set-point value and the second set-point value, the pulse duty factor is ⅛ when the value of the current is between the second set-point value and the third set-point value, and the pulse duty factor is 1/16 when the value of the current is greater than the third set-point value.

15. An electronic device for actuating a passenger-protection system, comprising:
- at least one acceleration sensor generating a sensor signal;
- a control unit for analyzing the sensor signal;
- a clock-pulse generator generating clock pulses;
- at least one squib coupled to the control unit and being traversed by a current having a pulse duty factor, pulses of the current flowing through the at least one squib being applied to the at least one squib as a function of the clock pulses;
- at least one restraining device being selectively actuated by the control unit using the at least one squib as a function of the analysis of the sensor signal;
- a current detecting arrangement detecting a value of the current flowing through the at least one squib and comparing the value of the current to at least one predetermined threshold value; and
- a current control arrangement coupled to the current detecting arrangement controlling the pulse duty factor of the pulses of the current flowing through the at least one squib as a function of the detected value of the current flowing through the at least one squib.

16. The electronic device according to claim 15, wherein the current detecting arrangement detects the value of the current flowing through the at least one squib as a function of the clock pulses.

17. The electronic device according to claim 15, wherein the clock-pulse generator is integrated in the control unit.

18. A method for operating an electronic device for actuating a passenger-protection system, the passenger-protection system including at least one restraining device actuated using at least one squib, comprising the steps of:
- generating clock pulses;
- applying a current to the at least one squib, the current having pulses and a pulse duty factor, the pulses of the current being applied to at least one squib as a function of the clock pulses;
- measuring a value of the current after a predetermined time period;
- comparing the measured value of the current to a predetermined threshold value; and
- if the value of the current deviates from the predetermined threshold value, modifying a pulse duty factor of the current.

* * * * *